United States Patent [19]

Ginger et al.

[11] 3,900,474

[45] Aug. 19, 1975

[54] TRIFLUOROALKYL, FLUOROBENZYL, PENTAFLUOROBENZYL, FLUOROBENZENESULFONYL, AND PENTAFLUOROBENZENESULFONYL THEOPHYLLINES

[75] Inventors: Roger D. Ginger, Park Ridge, Ill.; Carlos M. Samour, Wellesley, Mass.

[73] Assignee: The Kendall Company, Walpole, Mass.

[22] Filed: May 14, 1973

[21] Appl. No.: 360,260

[52] U.S. Cl. ............... 260/256; 260/252; 424/253
[51] Int. Cl.² ................................... C07D 473/08
[58] Field of Search ........................... 260/256, 252

[56] References Cited

UNITED STATES PATENTS

| | | | |
|---|---|---|---|
| 2,840,559 | 6/1958 | Krantz et al. | 260/256 |
| 2,924,598 | 2/1960 | Bestian | 260/256 |
| 3,245,994 | 4/1966 | Klingler et al. | 260/256 |
| 3,737,433 | 6/1973 | Mohler et al. | 260/256 |

*Primary Examiner*—Donald G. Daus
*Assistant Examiner*—Anne Marie T. Tighe

[57] ABSTRACT

A series of theophyllines substituted at either the -7 position, the -8 position or both the -7 and -8 positions with a fluoroalkyl, fluoroaryl, fluorohydroxyalkyl or fluoroaryl sulfonyl group are disclosed. These compounds are useful as bronchodilating agents.

7 Claims, No Drawings

TRIFLUOROALKYL, FLUOROBENZYL, PENTAFLUOROBENZYL, FLUOROBENZENESULFONYL, AND PENTAFLUOROBENZENESULFONYL THEOPHYLLINES

This invention is directed to a novel series of xanthine derivatives having the general structural formula

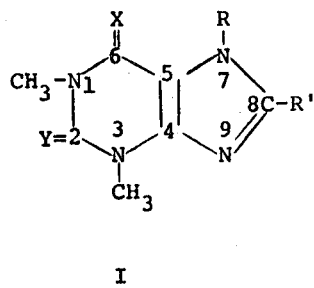

I wherein R and R' are independently selected from the group consisting of hydrogen, fluoroalkyl, fluoroaryl, fluorohydroxyalkyl and fluoroaryl sulfonyl with the proviso that R and R' cannot both be hydrogen; and X and Y are independently selected from the group consisting of oxygen and sulfur. The term "alkyl" as used herein refers to carbon chains having 1 to 4 carbon atoms.

Various substituted xanthines have been previously prepared and reported in the literature. For example, J. M. Parker et al. in J. Pharm. and Exptl. Ther., Vol. 118, No. 3, p. 359 (1956) report bronchodilator activity for a series of compounds including 7-chloroethyl theophylline, 7-allyl theophylline and 7-isoamyl theophylline, while U.S. Pat. No. 3,422,107 discloses the use of certain 7-(ω-haloalkyl)-1,3-dimethylxanthines as a reactant for the preparation of oxoalkyldimethylxanthines exhibiting vasodilator effects.

Now it has been found in accordance with this invention, that a series of fluorine containing theophyllines having the formula I can be prepared. These compounds exhibit valuable pharmacological activity and are particularly useful as bronchodilating agents.

As can be observed by reference to generic formula I, the above-described fluoro substituents can be provided at either the —7 position, the —8 position or both the —7 and —8 positions. Where compounds I having a fluoroalkyl, fluoroaryl, fluorohydroxyalkyl or fluoroaryl sulfonyl group in the —7 position are desired, one method of preparation involves a two-step procedure. First, the alkali metal salt of theophylline is formed by reacting theophylline with the appropriate alkali metal base in the presence of a suitable solvent. The salt may then be alkylated or arylated, as the case may be, by reacting it with the corresponding halide of the group to be substituted at the —7 position. This reaction scheme may be represented as follows wherein M is an alkali metal and R is fluoroalkyl, fluoroaryl, fluorohydroxyalkyl or fluoroaryl sulfonyl.

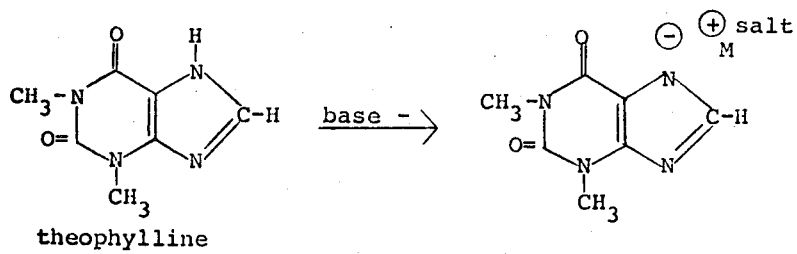

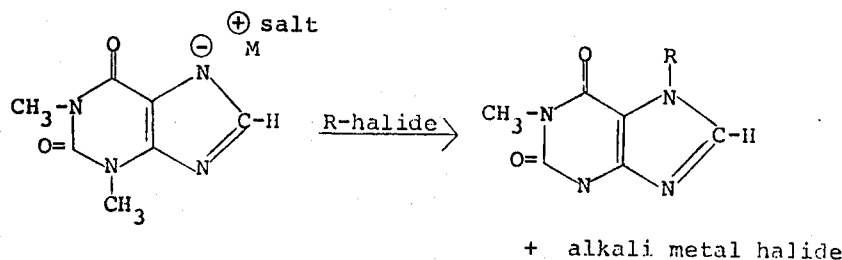

+ alkali metal halide

Exemplary halides suitable for reaction with the alkali metal salt of theophylline include fluoromethyl iodide; perfluoroethyl iodide; 2,4-difluorobutyl iodide; m-fluorobenzyl bromide; 2,4-difluorophenyl bromide; p-fluoromethylphenyl bromide; 2,3-dimethyl-4-fluorophenyl bromide; perfluorophenylsulfonyl chloride; etc.

Where compounds I wherein X and/or Y are sulfur are desired, the corresponding thio-theophylline derivative is used as the starting material.

An alternate route to the preparation of compounds I having a fluorohydroxyalkyl group in the —7 position comprises the alkylation of theophylline or a thio-theophylline with fluorine containing epoxides, such as 1-fluoroethylene oxide, 1-fluoro-3,4-epoxybutane, etc.

Where compounds I wherein R is hydrogen and R' is fluoroalkyl, fluoroaryl, fluorohydroxyalkyl or fluoroalkyl sulfonyl are desired, a uracil derivative is used as the starting material. The uracil derivative is acylated by reaction with the carboxylic acid derivative of the R' radical to be substituted. This reaction product is then cyclized by heating in the presence of a base to form the desired final product. This reaction may be represented as follows:

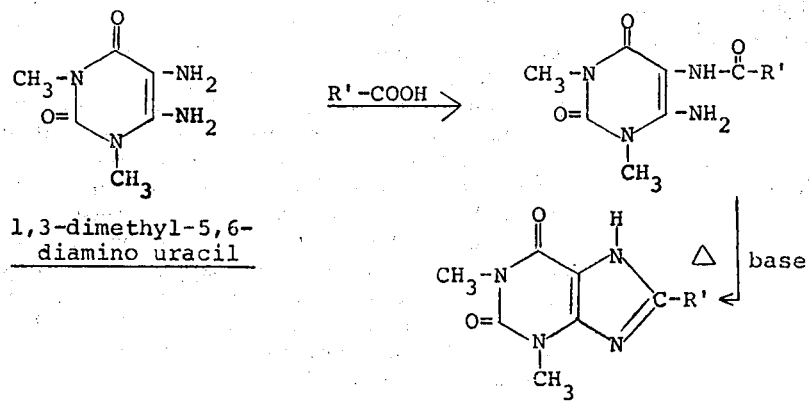

1,3-dimethyl-5,6-diamino uracil

Where compounds I wherein X and/or Y are sulfur are desired, the appropriate thio-uracil derivative is used as the starting material.

An alternate route to compounds I having a fluoro substituent at the —8 position comprises reacting a 4-chloro-1,3-dimethyl uracil with an amine having the formula R'NH₂ wherein R' is one of the previously described fluoro substituents to provide a uracil intermediate having the amino group at the —4 position. The uracil intermediate thus obtained is reacted with sodium nitrite followed by acidification with hydrochloric acid to provide the corresponding 5-nitroso uracil compound, which is cyclized by heating to yield the desired compound I.

Where compounds I having a fluoro substituent at both the —7 and —8 positions are desired, one first prepares either the —7 substituted or —8 substituted compound according to the previously described procedures, and then reacts the compound thus obtained with an appropriate alkali metal base to form the alkali metal salt of the —7 or —8 substituted compound. This salt is then alkylated or acylated with the appropriate alkyl or aryl halide; the reaction proceeds generally as described previously for the preparation of the —7 substituted compound.

The preparation of compounds I according to this invention is preferably carried out in the presence of an aprotic solvent, or an excess of a reactant where one of the reactants is a liquid. Suitable aprotic solvents include hydrocarbons such as benzene and xylene, dimethyl formamide, etc. While the reaction temperature is not critical, temperatures from about room temperature up to the reflux temperature of the system are generally employed. The desired compounds I are obtained in high yield and excellent purity and are readily isolated from the reaction medium by conventional techniques such as filtration, recrystallization, etc.

While any of the compounds having the formula I can be provided according to this invention, preferred are those compounds wherein R and R' are independently selected hydrogen, fluoroalkyl, fluorophenyl, fluorotolyl, fluoroxylyl, fluorobenzyl, fluoromethylbenzyl, fluorohydroxyalkyl or fluorobenzenesulfonyl with the proviso that R and R' cannot both be hydrogen; particularly preferred are the aforementioned compounds where X and Y are oxygen.

The compounds of this invention can be employed in therapeutic compositions in association with a pharmaceutically acceptable carrier according to conventional techniques. Compositions for oral administration can be solids or liquids and can take the form of syrups, isotonic solutions, tablets, capsules, aerosols, etc. Suitable solid physiologically acceptable carriers include lactose, magnesium stearate, sucrose, talc, stearic acid, gelatin, polyvinyl pyrrolidone etc. Exemplary liquid physiologically acceptable carriers are peanut oil, olive oil, sesame oil and water. Furthermore, the carrier may include a time delay material such as glyceryl monostearate or glyceryl distearate, alone or in combination with a wax.

If a solid carrier is used, the preparation can be tableted, placed in a hard gelatin capsule or in the form of a troche or lozenge. The amount of solid carrier will vary widely but preferably will be from about 25 mg. to about 1 gm. If a liquid carrier is used, the preparation may be in the form of a soft gelatin capsule, placed in an ampule or in a liquid suspension.

For parenteral adminstration, the carrier or excipient may be a sterile, parenterally acceptable liquid; e.g., water or a parenterally acceptable oil; e.g., arachis oil contained in ampules.

While any of the above compositions are efficacious, preferred are aerosol sprays and tablets for oral administration.

The following examples are presented in order to illustrate the practice of the invention and are not intended to limit the same thereby.

EXAMPLE 1

7-(2,2,2-trifluoroethyl)-theophylline

To a stirred suspension of 17.70 grams of potassium theophyllinate in 100 ml. of dry N,N-dimethylformamide, 14.30 grams of 2,2,2-trifluoroethyl iodide is added in one portion. The reaction mixture is heated under reflux at an oil bath temperature of 140°– 145°C for 22 hours. The mixture is then filtered hot and the filtrate evaporated to dryness under vaccum. The residue is triturated with 120 ml. of water and filtered. The crude product obtained is recrystallized from water to yield 10.5 grams of the product 7-(2,2,2-trifluoroethyl)-theophylline as pale yellow crystals, having a melting point of 153° – 154°C and the following elemental analysis:

| Analysis: | C | H | N | F |
|---|---|---|---|---|
| Calculated | 41.23 | 3.43 | 21.36 | 21.74 |
| Found | 41.58 | 3.31 | 20.82 | 21.95 |

EXAMPLE 2

7-(γ-fluoro-β-hydroxypropyl)-theophylline

A suspension containing 11.5 grams of anhydrous theophylline, 5.0 grams of epifluorohydrin and 0.3 ml. of anhydrous pyridine in 50 ml. of reagent grade n-propanol is heated under reflux for 1½ hours. The solvent is then removed under reduced pressure to give a white solid. This solid is then twice recrystallized from n-propanol to yield 10.1 grams of 7-(γ-fluoro-β-hydroxypropyl)-theophylline as white crystals having a melting point of 137° – 138°C and the following elemental analysis:

| Analysis: | F |
|---|---|
| Calculated | 7.40 |
| Found | 7.40 |

EXAMPLE 3

7-(p-fluorobenzyl)-theophylline

To a stirred suspension of 27.30 grams of potassium theophyllinate in 150 ml. of dry N,N-dimethylformamide, 18.1 grams of p-fluorobenzyl bromide dissolved in 50 ml. of dry N,N-dimethylformamide is added over 20 minutes. The reaction mixture is stirred and heated under reflux for 6 hours. This hot mixture is then filtered, the filtrate upon cooling yielding a white solid. The crude product is then recrystallized from ethanol to yield 27.7 grams of 7-(p-fluorobenzyl)-theophylline having a melting point of 199° – 200°C and the following elemental analysis:

| Analysis: | C | H | N | F |
|---|---|---|---|---|
| Calculated | 58.25 | 4.54 | 19.42 | 6.59 |
| Found | 58.76 | 4.63 | 18.97 | 6.63 |

EXAMPLE 4

7-(m-trifluoromethylbenzyl)-theophylline

To a stirred suspension of 16.8 grams of potassium theophyllinate in 150 ml. of dry N,N-dimethylformamide is added 15.0 grams of m-trifluoromethylbenzyl chloride in 30 ml. of dry N,N-dimethylformamide over a 15 minute period. The reaction mixture is heated under reflux for 12 hours. This hot mixture is then filtered, and the filtrate upon cooling yields a white solid. This crude product is then recrystallized from an ethanol-water solution to yield 19.0 grams of 7-(m-trifluoromethylbenzyl)-theophylline having a melting point of 120° – 121°C and the following elemental analysis:

| Analysis: | C | H | N | F |
|---|---|---|---|---|
| Calculated | 53.26 | 3.87 | 16.55 | 16.85 |
| Found | 53.96 | 3.93 | 16.33 | 17.40 |

EXAMPLE 5

7-(pentafluorobenzyl)-theophylline

To a stirred suspension of 2.18 grams of potassium theophyllinate in 30 ml. of dry N,N-dimethylformamide is added 2.60 grams of pentafluorobenzyl bromide in 20 ml. of dry N,N-dimethylformamide over a 10 minute period. The reaction mixture is heated under reflux for 6 hours and then filtered. To the filtrate is added 100 ml. of water causing a white solid to precipitate out of solution. The crude solid is recrystallized from an ethanol-water solution to yield 2.5 grams of 7-(pentafluorobenzyl)-theophylline having a melting point of 155° – 156°C and the following elemental analysis:

| Analysis: | C | H | N | F |
|---|---|---|---|---|
| Calculated | 46.68 | 2.50 | 15.55 | 26.37 |
| Found | 46.54 | 2.49 | 15.03 | 25.30 |

EXAMPLE 6

7-(p-fluorobenzenesulfonyl)-theophylline

To a stirred suspension of 10.90 grams of potassium theophyllinate in 100 ml. of reagent grade carbon tetrachloride is added 9.8 grams of p-fluorobenzenesulfonyl chloride in 25 ml. of carbon tetrachloride over a 10 minute period. The reaction mixture is heated under reflux for 8 hours and then filtered yielding a white solid crude product. The white solid is triturated with 250 ml. of water and filtered. The crude product is then recrystallized from ethanol to yield 9.0 grams of 7-(p-fluorobenzenesulfonyl)-theophylline having a melting point of 210° – 211°C and the following elemental analysis:

| Analysis: | C | H | S | F |
|---|---|---|---|---|
| Calculated | 46.15 | 3.27 | 9.46 | 5.62 |
| Found | 46.14 | 3.33 | 9.63 | 5.80 |

EXAMPLE 7

7-(pentafluorobenzenesulfonyl)-theophylline

To a stirred suspension of 4.1 grams of potassium theophyllinate in 50 ml. of carbon tetrachloride is added 5.0 grams of pentafluorobenzenesulfonyl chloride in 10 ml. of carbon tetrachloride. The reaction mixture is heated under reflux for 5 hours and then filtered yielding a white solid. The solid is triturated with 75 ml. of water and filtered once again. The crude solid is then recrystallized from an acetone-water solution to yield 4.0 grams of 7-(pentafluorobenzenesulfonyl)-theophylline having a melting point of 236° – 238°C and the following elemental analysis:

| Analysis: | C | H | S | F |
|---|---|---|---|---|
| Calculated | 38.06 | 1.72 | 7.80 | 23.16 |
| Found | 38.46 | 2.16 | 7.86 | 23.11 |

EXAMPLE 8

8-(p-fluorophenyl)-theophylline

A mixture containing 4.30 grams of 4-chloro-1,3-dimethyl uracil and 6.50 grams of p-fluorobenzylamine in 25 ml. of n-butyl alcohol is stirred and heated under reflux for 2 hours. The solvent is then removed under reduced pressure yielding a pink solid, which is then triturated with 100 ml. of water and filtered. Recrystallization from ethanol yields 5.0 grams of 1,3-dimethyl-4(p-fluorobenzylamino)-uracil.

A suspension is prepared containing 1.32 grams of the uracil intermediate and 0.43 grams of sodium nitrite in 40 ml. of water, and the suspension is acidified by the dropwise addition of dilute hydrochloric acid. The mixture is then allowed to sit for 1 hour at room temperature, and then filtered to yeild 1.0 grams of 1,3-dimethyl-5-nitroso-4-(p-fluorobenzylamine)-uracil.

A suspension of 0.8 grams of this uracil intermediate in 25 ml. of dry xylene is heated under reflux for 2 hours. After cooling to room temperature, the solid is filtered and recrystallized from a solution of acetic acid and water, yielding 0.5 grams of 8-(p-fluorophenyl)-theophylline having a melting point of >300°C and the following elemental analysis for fluorine:

| Analysis: | F |
|---|---|
| Calculated | 6.90 |
| Found | 6.90 |

EXAMPLE 9

8-(trifluoromethyl)-theophylline

A mixture of 8.5 grams of 4,5-diamino-1,3-dimethyl uracil and 22.8 grams of trifluoroacetic acid is stirred and heated under reflux for 4 hours. The excess trifluoroacetic acid is removed from the reaction mixture under reduced pressure. The remaining solid is recrystallized once from water and washed with benzene. Upon a second recrystallization from 50% aqueous ethanol, 2.0 grams of 8-(trifluoromethyl)-theophylline is obtained having a melting point of 261° – 263°C and the following elemental analysis:

| Analysis: | C | H | N | F |
|---|---|---|---|---|
| Calculated | 38.71 | 2.32 | 22.58 | 22.97 |
| Found | 39.75 | 3.02 | 23.00 | 21.40 |

The compounds having sulphur substituted in the –2 and/or –6 positions are prepared in a manner similar to the method described for preparing the corresponding oxygen derivatives. For example, 7-(2,2,2-trifluoroethyl)-6-thio-theophylline and 7-(2,2,2-trifluoroethyl)-2-thio-theophylline can be prepared in accordance with the procedure for preparing 7-(2,2,2-trifluoroethyl)-theophylline (see Example 1), by using the appropriate reactants according to the following reaction schemes:

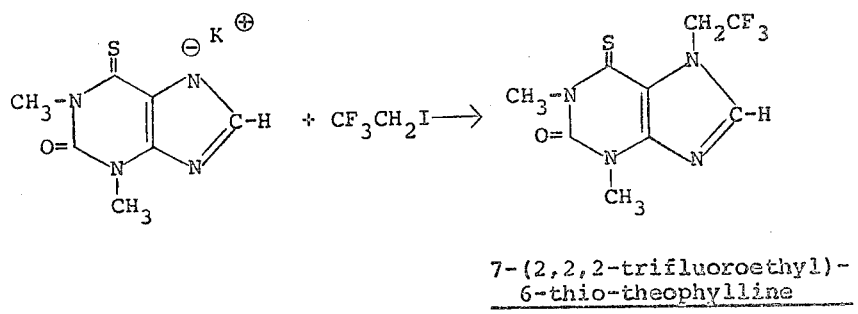

7-(2,2,2-trifluoroethyl)-6-thio-theophylline

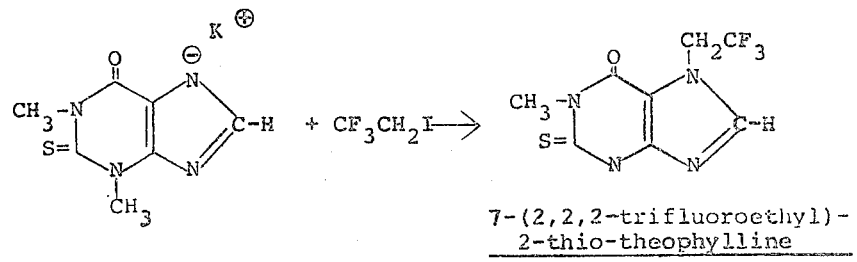

7-(2,2,2-trifluoroethyl)-2-thio-theophylline

The procedures of the foregoing examples may similarly be followed in preparing other –7 or –8 position substituted 2-thio, 6-thio, or 2,6-dithio theophylline derivatives.

The compounds of this invention have marked activity as bronchodilating agents. Furthermore, these compounds exhibit a pharmacological profile which appears to be more favorable than other known bronchodilators such as aminophylline and choline theophylline. In Table I below, the pharmacological profile of two of the compounds of this invention are compared with the two most prominent bronchodilators mentioned above.

TABLE I

| | 7-(γ-fluoro-β-hydroxy-propyl)theo-phylline | 7-(2,2,2-trifluoro-ethyl)theo-phylline | Amino-phylline | Choline theo-phylline |
|---|---|---|---|---|
| $LD_{50}$* in mg/kg, IP, mice | 680 | 460 | 257 | 74 |
| Sol in Water | >200 mg/ml pH-5 | 5 mg/ml pH-6 | 200 mg/ml (turbid on standing) pH-10-11 | 1000 mg/ml pH-10 |
| CNS activity, mice | depressant | depressant | stimulant | stimulant |
| Stability at stomach pH | stable | stable | unstable | less stable |

*$LD_{50}$ — represents the dose at which 50% of the animals expire expressed in terms of milligrams of active component per kilogram of body weight.

One of the most desirable features of these compounds is the fact that they appear to be central nervous system depressants rather than stimulants. Hence, these compounds maintain the animal in more tranquil state thereby helping to maintain the bronchial tubes in a relaxed or dilated condition. A stimulant activity deprives the agent of some of its beneficial effects by exciting the bronchial tubes thereby tending to constrict them. As can be observed from the above Table, the $LD_{50}$ is much higher for the instant compounds than for the known bronchodilating agents thereby affording a greater margin of safety.

Test procedures for measuring bronchodilating activity are well known in the art. The most commonly used in vivo test involves the use of a bronchoconstricting agent, such as histamine or methacholine chloride, against which the effectiveness of the test compound is measured compared to a standard or known bronchodilator and a control. A bronchoconstrictor such as histamine will cause a constriction of the bronchial tubes forcing the test animal to cough within a certain period of time after infusion of the bronchoconstrictor, and this time period may then be quantitatively measured. An agent alleged to have bronchodilating activity should offer some protection to the animal against a bronchoconstrictor and should therefore increase the coughing time.

Rather than measuring and comparing coughing times, however, it is statistically more significant to measure the percentage of protection afforded by the test compound as compared to the standard or known bronchodilator. This measurement is obtained by utilizing the formula $$\left[1 - \frac{T_c}{T_t}\right] \times 100$$

wherein $T_t$ is the coughing time after administration of the bronchodilator or test compound in response to a bronchoconstrictor, and $T_c$ is the mean of the coughing time of the control tested 3 days before the test and the coughing time of the control tested 3 days after the test. The comparison of the percentage of protection afforded by the test compound against the known bronchodilating agent provides a quick and accurate means for determining relative effectiveness of the test compound as a bronchodilating agent. The apparatus, general test procedure and calculation of the percentage of protection are explained in detail in the British Journal of Pharmacology (1961) Vol. 16, pp. 59–76.

In all of the experiments conducted, test animals (guinea pigs) which were hypersensitive or insensitive to bronchoconstrictors were eliminated in order to reduce variability; the bronchoconstrictor was employed as a 0.5% by weight aerosol in oxygen; mean control coughing times three days before and three days after administration of the bronchodilators were used in calculating percent protection against bronchoconstrictors; control animals were injected with 2 ml. of distilled water 30 minutes prior to their exposure to the bronchoconstrictor as was done with the bronchodilators; and a constant volume (2 ml.) of the test compound or reference compound in a solution prepared from 200 mg. USP gum tragacanth in 20 ml. water was always used for intraperitoneal injection in order to obtain uniform rate of absorption.

The tables following below illustrate the comparisons between a few of the compounds of this invention against some of the known bronchodilators.

TABLE II

| Compound | Dose - mg/kg Intraperitoneal | Mean % Protection ± Standard Error | Number of Animals Tested |
|---|---|---|---|
| 7-2,2,2-tri-fluoroethyl) theophylline | 1 | 22 ± 7 | 8 |
| | 4 | 17 ± 4 | 8 |
| | 16 | 21 ± 4 | 7 |
| Aminophylline | 70 | 14 ± 5 | 8 |
| | 105 | 33 ± 5 | 8 |

TABLE III

| Compound | Dose - mg/kg Intraperitoneal | Mean % Protection ± Standard Error | Number of Animals Tested |
|---|---|---|---|
| 7-(γ-fluoro-β-hydroxypropyl)-theophylline | 68 | 22 ± 5 | 9 |
|  | 136 | 42 ± 6 | 9 |
| Aminophylline | 70 | 14 ± 5 | 8 |
|  | 105 | 33 ± 5 | 8 |

TABLE IV

| Compound | Dose - mg/kg Oral | Mean % Protection ± Standard Error | Number of Animals Tested |
|---|---|---|---|
| 7-(2,2,2-trifluoroethyl)-theophylline | 25 | 17 ± 7 | 5 |
|  | 100 | 39 ± 12 | 3 |
| Choline theophylline | 25 | 4 ± 3 | 5 |
|  | 100 | 34 ± 8 | 4 |

Other compounds such as 7-(p-fluorobenzyl)-theophylline and 7-(m-trifluoromethylbenzyl)-theophylline were found to have relative potencies of 0.18 and 0.54, respectively, when compared against aminophylline, meaning that at any dose level, these compounds are 0.18 and 0.54, respectively, as active as the standard aminophylline.

Furthermore, the duration of protection of at least some of these compounds appears to be greater than at least choline theophylline. In Table V below, it will be observed that 7-(2,2,2-trifluoroethyl)-theophylline is about twice as effective after 6 hours as choline theophylline where a dose of 100 mg/kg each of the test compound and choline theophylline were compared when administered orally.

TABLE V
Duration of Protection

| Compound | Time in Minutes | Mean % Protection ± Standard Error | Number of Animals Tested |
|---|---|---|---|
| 7-(2,2,2-trifluoroethyl) theopylline | 90 | 34 ± 13 | 3 |
|  | 180 | 34 ± 18 | 3 |
|  | 360 | 61 ± 3 | 4 |
| Choline theophylline | 90 | 16 ± 9 | 4 |
|  | 180 | 9 ± 6 | 3 |
|  | 360 | 32 ± 3 | 3 |

7-(2,2,2-trifluoroethyl) theophylline was tested following a slightly different procedure from that outlined previously and compared with aminophylline. Guinea pigs were exposed to a 0.5% histamine aerosol (in oxygen), followed by a 1:200 aerosol of isoproterenol in oxygen to prevent the possibility of histamine poisoning, and the time required for the first signs of bronchoconstriction (cough) was recorded. Three to five days later the same animals were injected intraperitoneally with the test compound in 10% acacia and one hour later, they were re-exposed to the histamine and isoproterenol aerosols and the cough-time was redetermined. Two standard error units were added to the mean pretreatment cough-time and animals showing post-treatment cough times equal to or exceeding this value were recorded as showing a bronchodilator response. The results are shown in Table VI where $ED_{50}$ represents the amount necessary to effect bronchodilation in 50% of the test animals. Thus the 7-(2,2,2-trifluoroethyl) theophylline may be considered to have about twice the potency of aminophylline in this experiment.

TABLE VI

| Compound | Dose - mg/kg Intraperitoneal | Fraction of Animals Showing Bronchodilation | $ED_{50}$ (mg/kg) |
|---|---|---|---|
| 7-(2,2,2-trifluoroethyl) | 18 | 0/5 |  |
|  | 50 | 3/5 | 50(Approx.) |
|  | 100 | 5/6 |  |
| Aminophylline | 100 | 2/5 | 100(Approx.) |

What is claimed is:

1. The compound having the name 7-(2,2,2-trifluoroethyl)-theophylline.
2. The compound having the name 7-(p-fluorobenzyl)-theophylline.
3. The compound having the name 7-(m-trifluoromethylbenzyl)-theophylline.
4. The compound having the name 7-(pentafluorobenzyl)-theophylline.
5. The compound having the name 7-(p-fluorobenzenesulfonyl)-theophylline.
6. The compound having the name 7-(pentafluorobenzenesulfonyl)-theophylline.
7. The compound having the name 8-(trifluoromethyl)-theophylline.

* * * * *